(12) United States Patent
Cumberlege

(10) Patent No.: US 6,405,854 B1
(45) Date of Patent: Jun. 18, 2002

(54) BELT TRACKING ASSEMBLY

(75) Inventor: John Pear Cumberlege, Centurion (ZA)

(73) Assignees: Tru-Trac Rollers (PTY) Limited, Centurion; Paul Alan Savage, Vauchuse NSW, both of (ZA)

(*) Notice: Subject to any disclaimer, the term of this patent is extended or adjusted under 35 U.S.C. 154(b) by 0 days.

(21) Appl. No.: 09/509,647

(22) PCT Filed: Oct. 6, 1998

(86) PCT No.: PCT/AU98/00835

§ 371 (c)(1),
(2), (4) Date: Oct. 30, 2000

(87) PCT Pub. No.: WO99/18018

PCT Pub. Date: Apr. 15, 1999

(30) Foreign Application Priority Data

Oct. 3, 1997 (ZA) ............................................. 97/8872

(51) Int. Cl.⁷ ............................................. B65G 39/16
(52) U.S. Cl. .................................. 198/806; 198/810.03
(58) Field of Search ........................... 198/806, 810.03, 198/808

(56) References Cited

U.S. PATENT DOCUMENTS

| | | | | |
|---|---|---|---|---|
| 1,963,099 A | * | 6/1934 | Robins ........................ | 198/202 |
| 2,160,057 A | * | 5/1939 | Carus et al. ................ | 198/806 |
| 2,725,757 A | * | 12/1955 | Murphy ...................... | 198/806 |
| 2,815,851 A | * | 12/1957 | Yoshimura ................. | 198/202 |
| 3,058,574 A | * | 10/1962 | Gianukos .................... | 198/806 |
| 3,075,633 A | * | 1/1963 | Lo Presti .................... | 198/202 |
| 3,240,321 A | * | 3/1966 | Lo Presti et al. ........... | 198/202 |
| 3,303,924 A | * | 2/1967 | Hartzell, Jr. ................ | 198/806 |
| 3,593,841 A | * | 7/1971 | Leow .......................... | 198/806 |
| 3,621,728 A | * | 11/1971 | Steorts, Jr. .................. | 198/806 |
| 4,506,782 A | * | 3/1985 | Jeanneret et al. ........... | 198/806 |
| 4,936,441 A | * | 6/1990 | Akesaka .................... | 198/626.2 |
| 5,609,240 A | * | 3/1997 | Shaw .......................... | 198/806 |
| 5,911,304 A | * | 6/1999 | Cumberlege ................ | 198/806 |
| 5,950,806 A | * | 9/1999 | Warneke ..................... | 198/806 |
| 6,116,410 A | * | 9/2000 | Malmberg ................... | 198/806 |
| 6,173,830 B1 | * | 1/2001 | Cumberlege et al. ....... | 198/842 |
| 6,186,317 B1 | * | 2/2001 | Hovsto et al. .............. | 198/806 |
| 6,241,078 B1 | * | 6/2001 | Mott ........................... | 198/806 |
| 6,246,858 B1 | * | 6/2001 | Condello et al. ........... | 399/329 |
| 6,247,580 B1 | * | 6/2001 | Hovsto et al. .............. | 198/806 |
| 6,279,733 B2 | * | 8/2001 | Eltvedt ........................ | 198/816 |
| 6,286,663 B1 | * | 9/2001 | Hartmann ............... | 198/810.03 |

FOREIGN PATENT DOCUMENTS

| | | |
|---|---|---|
| AU | 19409/45 | 4/1947 |
| FR | 2 692 236 | 12/1993 |
| JP | 09-020415 | 1/1997 |
| WO | WO 97/47538 | 12/1997 |

OTHER PUBLICATIONS

International Search Report.

* cited by examiner

Primary Examiner—Christopher P. Ellis
Assistant Examiner—Rashmi Sharma
(74) Attorney, Agent, or Firm—Merchant & Gould PC

(57) ABSTRACT

A tracking assembly for tracking belts and webs comprises a support frame which is adapted to be mounted below a traveling belt or web. A straight or angled support shaft is pivotally mounted at its center via a post which is rotatable within bush on the support frame. A selected arc of rotation of the post within the bush is determined by an adjustable limit stop arrangement which can take the form of a pair of grub screws. A roller is mounted onto each end of the shaft. The two rollers have tapered ends. When the belt or web travels off center it will come into contact with the tapered end of the roller on the side to which the belt has moved. This will cause the shaft to pivot about a vertical axis of the post and thereby steer the belt back to a central position.

7 Claims, 2 Drawing Sheets

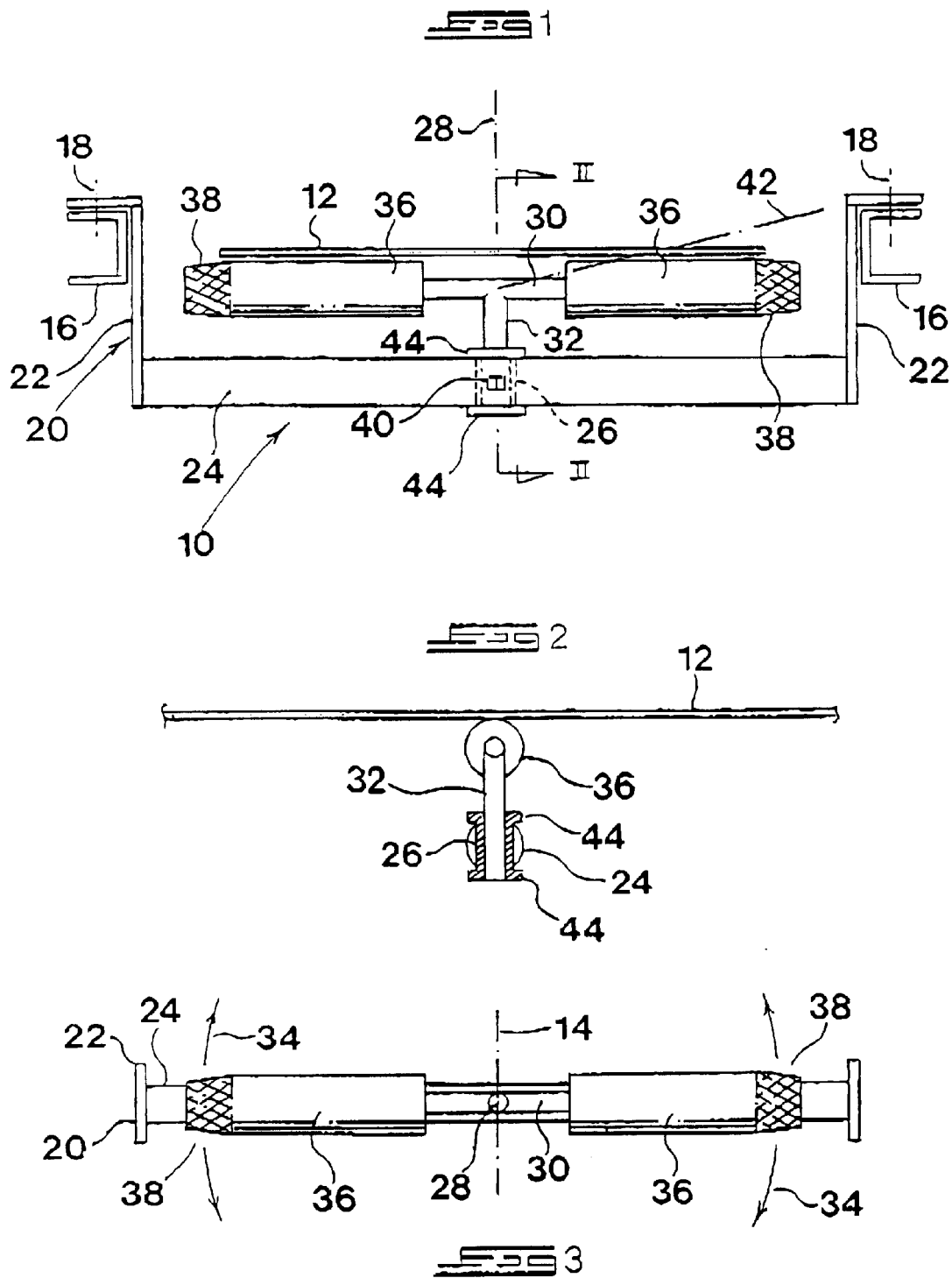

BELT TRACKING ASSEMBLY

BACKGROUND OF THE INVENTION

THIS invention relates to a tracking assembly of the type adapted to track the alignment of belts and webs. The invention will be described with particular reference to a tracking roller for tracking conveyor belts, but it is to be understood that the invention can be used in a number of different applications such as the tracking of other belts, webs, sheets, lengths of cloth, and the like.

Tracking rollers are known and one roller which has proved to be particularly effective in practice is that described in applicants PCT patent no. PCT/AU95/00618. The specification of that patent is incorporated herein by way of reference. The tracking roller described in patent no. PCT/AU95/00618 has proved to be particularly effective for tracking of conveyor belts, particularly belts up to about 1200 mm wide. Belts wider then that tend to cause failure of the shaft which carries the drum due to the high bending moment which is induced into the centre of the shaft at the pivot point of the roller.

The specification of patent no. PCT/AU95/00618 describes only the tracking of flat belts. However, trough shaped conveyor belts and V-shaped return belts are used in many installations and the applicant has found that certain of the principles described in patent no. PCT/AU95/00618 can surprisingly be utilised for the tracking of non-flat belts.

SUMMARY OF THE INVENTION

According to the invention there is provided a tracking assembly for tracking belts and webs comprising:

a support frame adapted to be mounted below a travelling belt or web;

a generally elongate support shaft pivotally mounted about its centre to the frame and pivotable relative to the frame about a generally vertical pivot axis;

a roller mounted cantilever fashion to each end of the shaft, each roller being rotatable about an axis which is coincident with the shaft axis, the two rollers being adapted to support said travelling belt or web;

each of the rollers having a reduced diameter end region on the distal end thereof which, when either one of said end regions is contacted by a belt or web travelling off-centre will cause the shaft to pivot relative to the support frame and thereby steer the belt or web back to a centralized position.

The shaft may be straight or may be of V-shaped configuration.

Preferably the elongate support shaft has a stop means associated therewith adapted to limit the pivotal rotation of the shaft relative to the frame through a selected pivotal arc. The stop means may be adjustable in order to vary the pivotal arc through which the shaft is able to pivot.

These and further features of the invention will be made apparent from the description of an embodiment thereof given below by way of example. In the description reference is made to the accompanying drawings but the specific features shown in the drawings should not be construed as limiting on the invention.

BRIEF DESCRIPTION OF THE DRAWINGS

FIG. 1 shows a side view of a conveyor tracking assembly according to the invention viewed along the length of the conveyor belt;

FIG. 2 shows a cross-sectional side view of the assembly depicted in FIG. 1 taken along section line II—II depicted in FIG. 1;

FIG. 3 shows a plan view of the assembly shown in FIG. 1;

DETAILED DESCRIPTION

Figure 4:
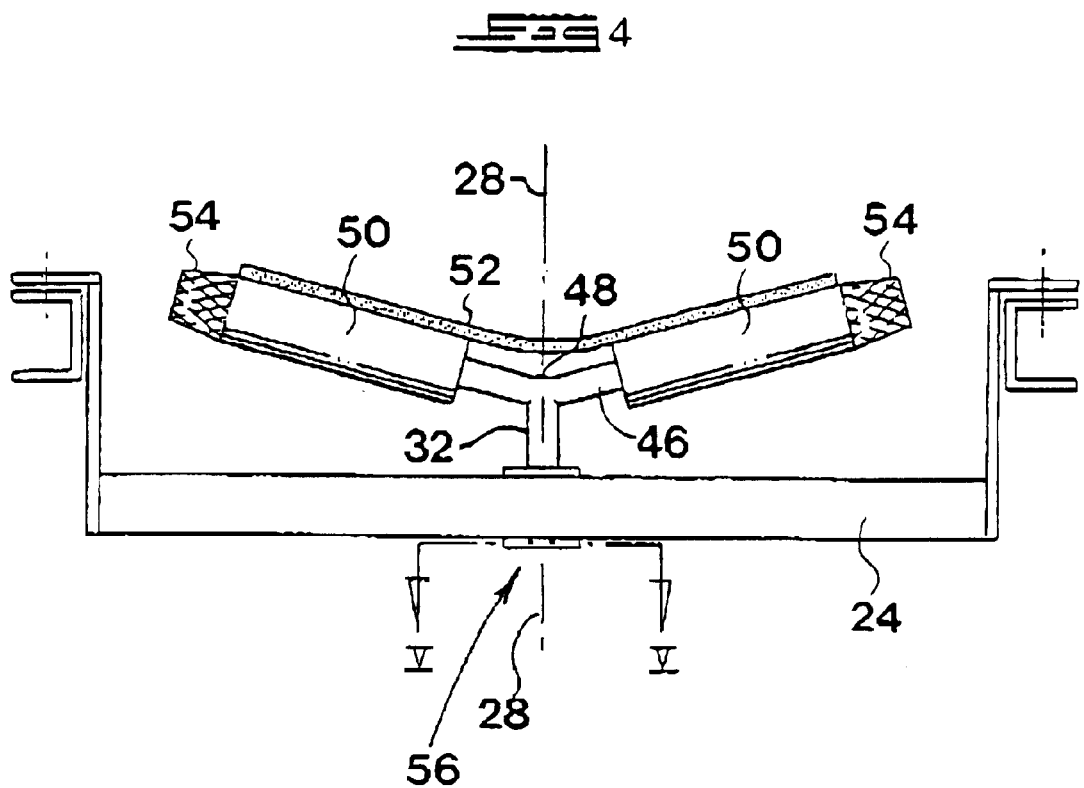
FIG. 4 shows a side view of a second embodiment of the tracking assembly viewed along the length of a conveyor belt.

As shown in the drawings, a conveyor tracking assembly 10 is adapted to keep a conveyor belt 12 travelling along the centre line 14 of its intended path of travel. The assembly 10 is mounted to a conveyor frame 16 by means of bolts 19 which connect into the standard mounting holes on the frame 16. The assembly 10 includes a support frame 20 which comprises a pair of side brackets 22 and a relatively robust cross bar 24. The cross bar may conveniently comprise a thick walled pipe or the like. The cross bar 24 has a bush 26 mounted in the centre thereof, the bush 26 defining an axis 28 which will be referred to in more detail below. An elongate support shaft 30 lies parallel to the plane of the belt 12. The support shaft 30 is centrally mounted on a post 32 which is rotatable within the bush 26. This arrangement allows the elongate shaft to pivot about the axis 28. The pivot action is shown by arrows 34 in FIG. 3.

Rollers 36 are mounted, cantilever fashion, on the elongate shaft 30 as shown. These rollers 36 have a taper, at their distal ends 38, the respective tapers being convergent in a direction away from the axis 28. The angle of taper of the ends 38 will be between about 0.5 E and 5 E, depending on the sensitivity of tracking action required.

In the manner described in detail in the specification of patent no. PCT/AU95/00618, as the belt 12 moves onto one or other of the tapers 38 this will have the effect of placing an eccentric load on the rollers and cause the rollers to pivot in the direction of arrows 34. Since this aspect of the invention is described in detail in patent no. PCT/AU95/00618 it need not be described herein in any further detail.

The advantage of the arrangement shown is that the pivot is carried by the cross bar 24. The cross bar 24 can be made as robust as necessary and therefore the assembly can be used with particularly heavy or wide belts.

If it is required to limit the angle to which the rollers are able to pivot about axis 28 some form of stop arrangement as indicated at numeral 40 can be provided. The arrangement shown at numeral 40 is a slot and pin arrangement adapted to limit the slewing of the rollers to an arc of approximately 20 E.

Clearly the invention is not limited to the arrangement described herein. For example, the shaft 30 need not be a straight shaft and could be angled as indicated by dotted line 42 to accommodate V-shaped belts. This arrangement is shown in FIG. 4 of the drawings. As shown in FIG. 4, the shaft is not straight but is of trough configuration, mounted at its centre to the post 32. The shaft 46 and post 32 together for a Y-shaped assembly joined together at a hub 48. The shaft 46 has a roller 50 mounted to each end thereof, the two rollers 50 forming a trough shaped support for a belt 52. The distal ends 54 of the two rollers 50 arc tapered as shown to provide the arrangement for causing the shaft and roller assembly to slew when the belt travels off centre.

Figure 5:
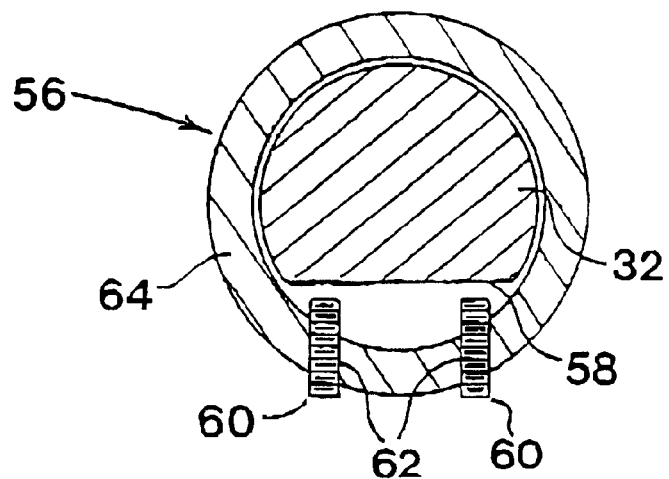
FIG. 5 shows a sectional view along section line V—V depicted in FIG. 4 of the drawings.

An adjustable limit stop 56 is adapted to prevent the shaft 46 from slewing through more than a selected arc. The limit stop 56 is shown in detail in FIG. 5 of the drawings. As shown, the post 32 is provided with a flat face 58 on one side thereof. A pair of grub screws 60 pass through threaded bores 62 in circular collar 64 which is fixed to the underside of the bar 24. By screwing the grub screws 60 towards and away from the flat face 58 the angle of pivot of the shaft 46 about axis 28 can be adjusted.

The pivot assembly provided by the bush 26 and post 32 provides a particularly effective and efficient pivoting arrangement. It is envisaged that the post 32 and the bush 26 will be made from a corrosion resistant material such as stainless steel to ensure that the pivoting action is not to any significant extent frictionally compromised. Also, appropriate seals will be provided to ensure that contaminants do not enter into the bush 26 in use.

It should be noted that the term Avertical≡ as used herein is intended to indicate the orientation of the pivot axis with a horizontally aligned belt. When a belt is inclined the pivot axis will be inclined so that the pivot axis remains perpendicular to the plane of the belt.

What is claimed is:

1. A tracking assembly for tracking belts and webs comprising:

a support frame adapted to be mounted below a travelling belt or web;

a generally elongate support shaft pivotally mounted about its centre to the frame and pivotable relative to the frame about a generally vertical pivot axis;

a roller mounted cantilever fashion to each end of the shaft, each roller being rotatable about an axis which is coincident with the shaft axis, the two rollers being adapted to support said travelling belt or web;

each of the rollers having a reduced diameter end region on the distal end thereof which, when either one of said end regions is contacted by a belt or web travelling off-centre will cause the shaft to pivot relative to the support frame and thereby steer the belt or web back to a centralized position.

2. A tracking assembly according to claim 1 wherein the shaft is of non-linear configuration.

3. A tracking assembly according to claim 2 wherein the shaft is of trough configuration.

4. A tracking assembly according to claim 1 wherein the shaft is connected to a vertically extending post which is rotatably mounted in a bush located in said support frame.

5. A tracking assembly according to claim 1 wherein the support frame comprises a cross bar having a mounting bracket on each end thereof.

6. A tracking assembly according to claim 1 which includes stop means for limiting the pivotal rotation of the shaft relative to the frame.

7. A tracking assembly according to claim 6 wherein the stop means is adjustable so as to provide an arrangement for varying the pivotal arc through which the shaft is able to pivot.

\* \* \* \* \*